Aug. 29, 1967 L. ECK 3,338,083
PORTABLE TOOL FOR REPAIRING DAMAGED AUTOMOBILE BODIES
Filed March 15, 1965 3 Sheets-Sheet 1
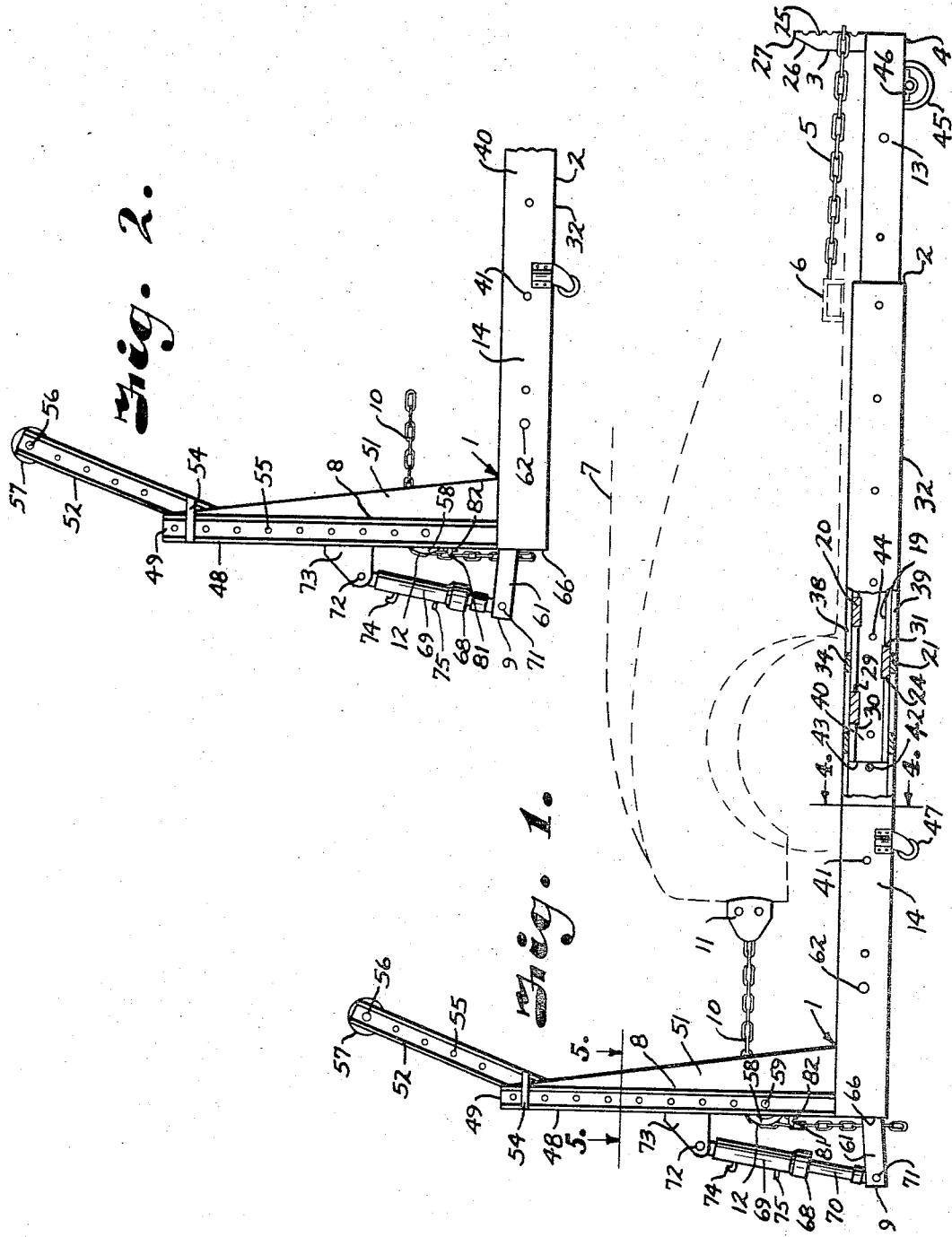
INVENTOR.
LEONARD ECK
BY
Fishburn and Gold
ATTORNEYS

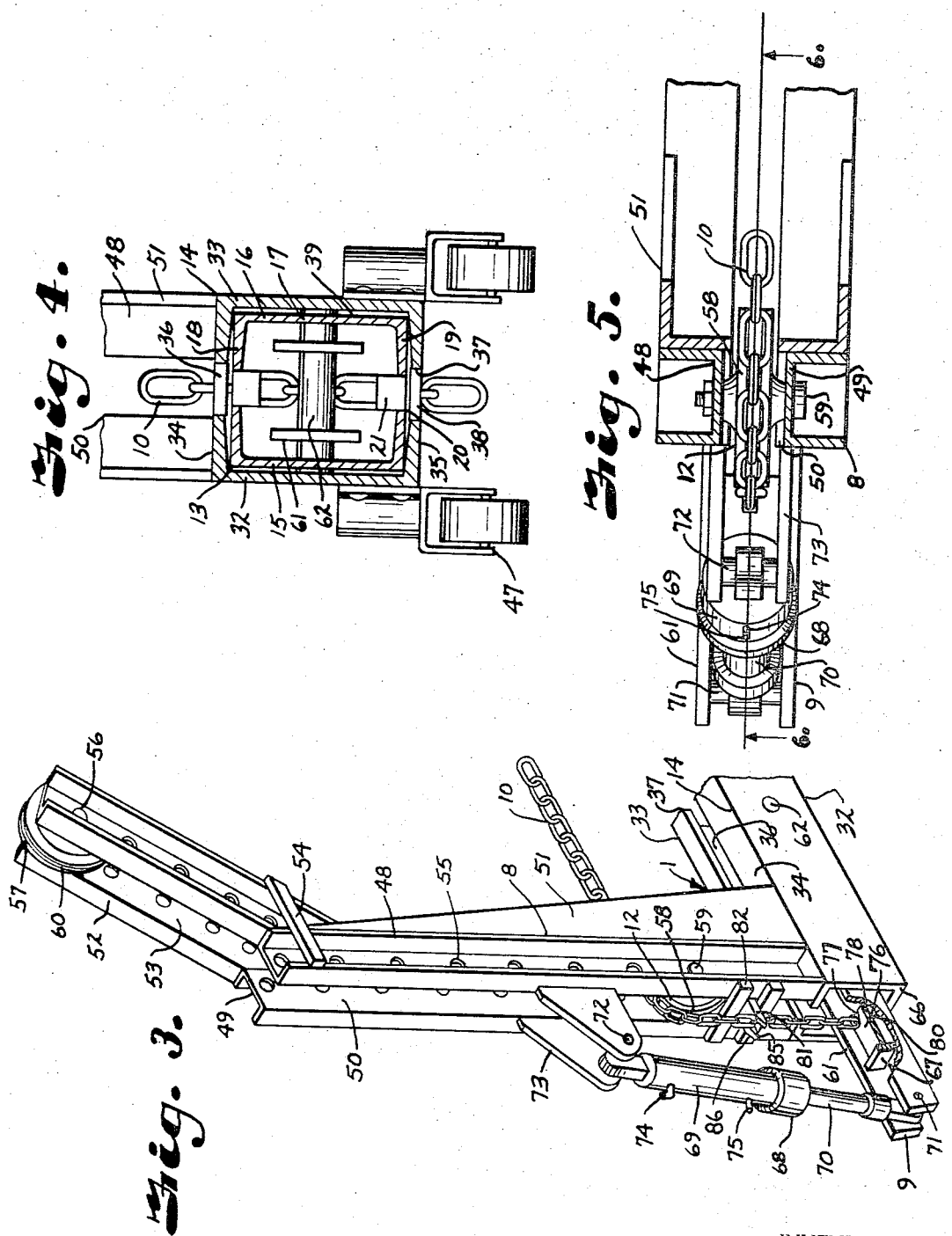

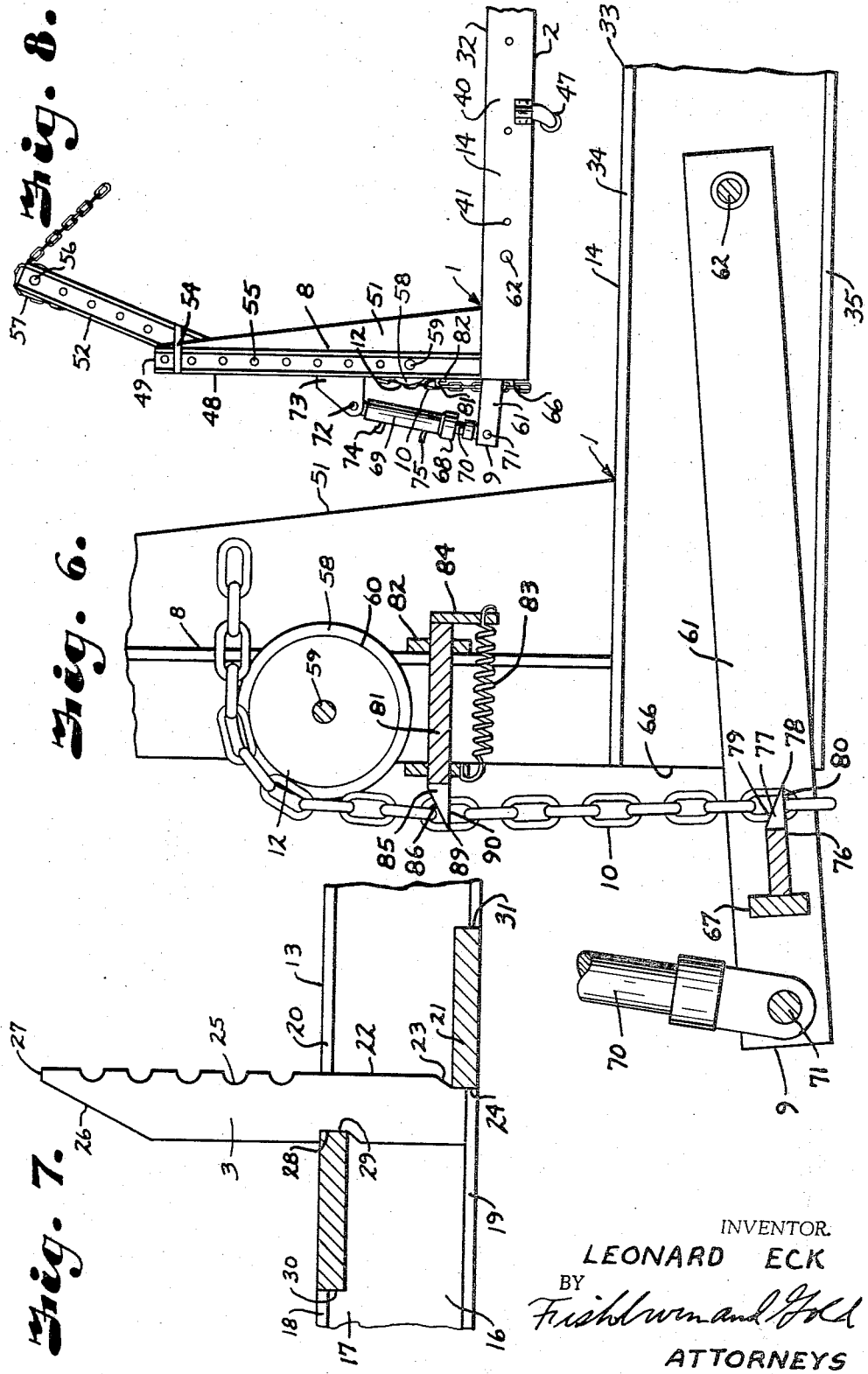

United States Patent Office 3,338,083
Patented Aug. 29, 1967

3,338,083
PORTABLE TOOL FOR REPAIRING DAMAGED
AUTOMOBILE BODIES
Leonard Eck, Box 110, McPherson, Kans. 67460
Filed Mar. 15, 1965, Ser. No. 439,686
8 Claims. (Cl. 72—305)

ABSTRACT OF THE DISCLOSURE

A mechanism for straightening vehicle bodies by applying tensional forces at selected portions thereof including a mobile elongate beam with an anchor member selectively positioned along the length thereof with means to connect said anchor member to a selected portion of a vehicle, said beam having a standard fixed thereon and upstanding therefrom and an end portion opposite from the anchor with a lever pivotally mounted on the beam and operable by an extensible member connected to the standard. A guide means selectively positioned on the standard and a flexible member having one end fixed to a selective portion of the vehicle and extending over the guide means and engaged with a unidirectional member on the lever to apply force through the flexible member to the vehicle in response to extension of the extensible member, a unidirectional member being on the standard and engaging the flexible member to prevent retractive movement thereof during retractive movement of the lever and permitting moving of the flexible member thereby in response to movement of the lever through extension of the extensible member whereby the flexible member continues to apply tensional force to the vehicle.

---

The principal objects of the present invention are to provide a tool that can be moved to positions adjacent to or under a vehicle with a portion secured to the vehicle and a flexible member connected to a damaged portion, with mechanism for applying a pulling force to said flexible member; to provide such a structure with an elongate extensible beam having one end portion for connection to a vehicle and an upright column or standard at the other end portion with guide means selectively positioned on the column to guide the extensible member for proper directional application of the forces to the vehicle; to provide such a structure wherein the flexible member is a link chain and there are members engageable therewith to apply a unidirectional holding force to prevent retractive movement thereof; to provide such a structure where one of the chain-engaging members is on a lever with an extensible member for effecting swinging movement of the lever to apply forces to the chain; to provide such a structure wherein the extensible member moving the lever is a hydraulic ram; and to provide mechanism for straightening automobile bodies that is economical to manufacture and efficient in operation in applying forces to pull the body portions to straighten same.

Other objects and advantages of this invention will become apparent from the following description taken in connection with the accompanying drawings wherein are set forth by way of illustration and example certain embodiments of this invention.

FIG. 1 is a side elevation of the mechanism embodying the invention, and illustrating one manner of positioning and anchoring same for straightening an automobile body portion, which is shown in broken lines.

FIG. 2 is a partial side elevation of the mechanism with the force-applying lever retracted.

FIG. 3 is a partial perspective view of the mechanism with the ram-actuated lever applying a pulling force to the chain.

FIG. 4 is an enlarged fragmentary sectional view through the mechanism taken on the line 4—4, FIG. 1.

FIG. 5 is an enlarged fragmentary sectional view taken on the line 5—5, FIG. 1.

FIG. 6 is an enlarged fragmentary sectional view through the mechanism taken on the line 6—6, FIG. 5.

FIG. 7 is an enlarged fragmentary sectional view through the beam and rear anchor member.

FIG. 8 is a partial side elevational view of the mechanism with the chain guide member in an upper position on the column for different angle of application of forces from that shown in FIG. 1.

Referring more in detail to the drawings:

The reference numeral 1 generally designates a portable tool or mechanism for use in straightening vehicle bodies, frames and the like and includes an elongate beam member 2 having an anchor member 3 adjacent one end 4 and adapted to be secured as by a flexible member such as a chain 5 to a portion 6 of a vehicle having a body 7 to be straightened. The mechanism also includes a column or upstanding standard 8 at the other end of the beam 2 with means 9 for applying tension to an elongate flexible member, for example a link type chain 10, connected by a suitable connection 11 to a portion of the body 7 to be straightened. The upright column 8 also includes a guide member 12 selectively positioned at suitable elevations thereon for guiding the chain 10 and particularly adapted for providing different angles or directions in the application of force to the body portion being straightened.

In the structure illustrated, the beam 2 is extensible for varying the length thereof with a rearward member or portion 13 telescoped into a forward portion 14 which carries the standard 8. In order to provide suitable strength and stability, it is preferred that each of the beam portions 13 and 14 be generally of box-like structure and, in the illustrated structure, the beam portion 13 is formed by parallel channel members 15 and 16 having vertically arranged webs 17 and the upper and lower flanges 18 and 19 respectively extending inwardly with the inner edges 20 of said flanges spaced apart but connected at intervals by inserts 21 suitably secured to the flanges as by welding whereby the inserts form lugs adapted to engage and position the anchor member 3. The inserts 21 are spaced longitudinally of the channel members or beam portion with those between the upper flanges staggered relative to those between the lower flanges and providing a spacing whereby when the anchor member 3 is mounted on the beam it will engage the upper and lower lugs to resist forces applied through the means 5 to the automobile in straightening parts of the body.

In the structure illustrated the anchor member 3 is a bar-like structure adapted to be arranged in upstanding relation relative to the beam portions between the edges 20 of the flanges 18. A rearward edge 22 of said anchor has a recess portion 23 adapted to be engaged with a forward edge 24 of a lower insert 21 and spaced above the beam are a plurality of spaced notches 25 to be engaged by the member 5 to aid in holding said member against slippage up and down on the anchor member. The upper forward edge 26 of the anchor member is inclined downwardly whereby the upper end portion 27 is smaller to facilitate movement of a loop of a chain 5 or the like thereover. The forward edge portion of the anchor member has a notch 28 adapted to receive a rear edge portion 29 of the next forward upper insert 21 whereby when force is applied to the upper portion of the anchor member tending to move same to the left (FIG. 7) the engagement of the lugs 21 with the notched portion of the anchor 3 holds the anchor in place. There are a plurality of the lugs 21 having such spacing and also the spacing between the forward edge 30 of the lug and the rearward edge 31 of the lower lug next forwardly thereof is such that the anchor member can be placed therebetween and engaged therewith only in the reverse direction for application of forces through the anchor member 3 tending to pull same to the rear of the beam member 2.

The beam portion or member 14 is also of generally box-like structure formed of parallel channel members 32 and 33 having upper and lower flanges 34 and 35, respectively, that are spaced apart so that there is a longitudinal extending slot 36 between the innermost edges 37 of the flanges. The flanges are connected by insert members or lugs 38 to form a strong box-like struncture wherein an inner cross-section defines a way 39 in which the beam portion 13 is slidable. The webs 40 of the channels defining the beam portion 14 have a plurality of apertures 41 spaced longitudinally thereof, the apertures being transversely aligned in the beam portion structure. A pin or abutment member 42 is selectively positioned in the apertures 41 and adapted to be engaged by the forward end 43 of the beam portion 13 to limit contractive movement of the beam portions, as, for example, when opposite forces are being applied to a body member located between the upright or standard 8 and the anchor 3. The beam portion 13 also has a plurality of spaced transversely aligned apertures 44 that are alignable with selected apertures 41 in the beam portion 14 whereby the pin 42 can extend therethrough to secure the beam portions against relative extension or contraction and thereby resist forces in either direction. It is preferred that the structure be portable and easily movable over a floor or the like. In the structure illustrated, a roller 45 is mounted in bearings 46 at the rear of the beam portion 13 and casters 47 are mounted on opposite sides of the beam portion 14 in the forward part thereof as illustrated in FIG. 1.

The standard or upright member 8 includes upwardly extending opposed channel members 48 having their webs 49 defining a space 50 therebetween that is slightly wider than the space 37 between the inner edges 37 of the flanges 34 and 35 of the beam portion 14. The lower ends of the channel members 48 are preferably secured as by welding to the forward end portion of the flanges 34. Brace members 51 extend upwardly of each of said channel members 48 and are suitably secured as by welding to said channels and the beam portion 14 to form gusset-type reinforcing. The upright also includes extensions 52 that are channel members substantially corresponding to the channel members 48 and having their webs 53 coplanar with the webs 49. The extensions 52 are inclined upwardly and rearwardly relative to the upper end portions of the channels 48 and are suitably secured thereto as by welding. Also, brace members 54 connect the adjacent ends of the channels 48 of the extension 52 to provide a rigid structure. A plurality of transversely aligned apertures 55 are spaced longitudinally of the channels 48 and extensions 52 with each of said transversely aligned apertures being adapted to receive a bearing shaft or pin 56 extending therethrough and rotatively mounting a pulley 57 thereon. In the structure illustrated, there is a pin 56 and pulley 57 at the extension portion of the standard and a second pulley 58 is mounted on a pin or shaft 59 in aligned apertures 55 of the channels 48. Either or both of the pulleys may be used as desired. The pulleys preferably have grooves 60 adapted to have the flexible elongate member 10 run thereover as, for example, the grooves provide guides for link-type chains as illustrated in the drawings. The pulley locations in the apertures 55 of the channel portions 48 provide a generally forward direction of pull and permits inclination thereof when the pulley is in the upper portion of the channel 48 and a more upward direction when the pulley in the extension 52 is used.

A flexible member or chain 10 extends over the pulley 58 and then downwardly between spaced lever members 61 pivotally mounted on a shaft 62 supported in the beam portion 14 extending transversely thereof. The lever portions or members 61 extend forwardly and beyond the forward end 66 of the beam portion 14. The lever members 61 are connected together by transverse portions 67 to form a rigid member. The lever is moved up and down in response to operation of a suitable power means in the form of an extensible member such as a hydraulic ram 68 having a cylinder 69 with a piston rod 70 extending therefrom with one end of the ram pivotally connected as at 71 with the forward end of the lever 61 and the other end pivotally connected as at 72 to spaced bracket members 73 fixed on and extending forwardly from the channels 48 of the standard 8 as illustrated in FIG. 3. It is preferred that the ram have a suitable connections 74 and 75 with pump and valve structures not shown whereby the ram may be extended and contracted under power as desired. Extension of the ram swings the lever 61 downwardly and contraction swings the lever upwardly.

A suitable member 76 for engaging or gripping the chain or flexible member 10 is mounted on the lever members 61 to apply a pulling force to said chain but allowing the member and chain to move relatively in the opposite direction without appreciable resistance. In the structure illustrated, the member 76 is in the form of a finger or detent that extends transversely of the lever members 61 and is secured thereto as by welding with the rear end portion of said member having a slot 77 for a link of a chain to extend therein whereby the link is positioned in the slot forwardly of the rear end 78 of said detent and the next adjacent links are transversely relative to said finger. The upper rear portion of said detent slopes downwardly and rearwardly as at 79 to the end 78 and the lower face 80 is adapted to receive the next lower link and engage same to apply a downward force thereon. In this manner downward swinging movement of the lever member 61 will apply a downward force on the chain and thereby, since the chain is extending over the pulley 58, will apply a forward pulling force on the member 11 that is secured to the body portion to be straightened.

Retractive movement of the chain 10 is prevented by an engaging member or finger 81 slidable in guides 82 mounted on the standard 8 below the pulley 58. A spring 83 is connected to the finger and standard to urge the finger forwardly with a stop member 84 adapted to engage a portion of the standard to limit the forward movement. The forward end of the finger is provided with a slot 85 whereby one chain link can be positioned therein and the next adjacent links be transversely of said finger. The upper face 86 is inclined forwardly and downwardly to a point or end 89 with the lower face 90 adapted to engage the next lower link if the chain portion should be moving upwardly whereby the engagement would stop the movement of the chain and prevent further retractive movement.

With a structure constructed as illustrated and described and a flexible member 5 connecting the anchor 3 to the body to be straightened or portions of the vehicle thereof and a member 11 connected to a portion of the body to be straightened, the chain 10 is extended over the pulley 58 and downwardly to the finger 76. Applying pressure to the ram 68 to extend same will swing the lever members 61 downwardly whereby engagement of the chain links with the member 76 will provide a pull on the chain. During this pulling movement, the engagement of the chain with the inclined face 88 will effect retractive movements of the finger 81 whereby the chain can be pulled by said finger. When the downward swinging stroke of the lever members 61 is completed, the application of pressure to the ram is reversed to contract same effecting upward swinging movement of the lever members 61. This starts a retractive movement of the chain and the next transverse link below the finger 81 will engage said face 90 of the finger 81 and prevent further retractive movement. During upward movement of the lever member 61 the chain links will cam on the surface 79 and move rearwardly so that the chain links will pass the finger member 76 and then move back into the slot for engagement of a link for further downward pull on the chain and additional pull on the body to be straightened. This action can be repeated until sufficient movement has been imparted for the straightening of the body portion.

In some structures, it is desirable to have the force supplied in a more upward direction and in such event the chain is connected to the portion of the body to be straightened and extended over the pulley 57 and then downwardly to between the lever members 61. The same action of the ram is applied to apply a pull on the chain and body straightening action. This arrangement of the chain is shown in FIG. 8. Obviously, the angle of application of the forces can be widely varied by varying the position of the pulley from the lower position on the upright to the uppermost position on the extension thereof.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A mechanism for straightening automobile parts comprising:
  (a) a supporting beam of appreciable length,
  (b) means connecting a portion of an automobile to one end portion of said supporting beam,
  (c) a standard fixed to the other end portion of the supporting beam and upstanding therefrom,
  (d) an extensible member rockably connected to said standard,
  (e) a flexible member connected to a portion of an automobile to be straightened,
  (f) means actuated by said extensible member and having a portion engaging said flexible member to apply tension thereto in response to extension of the extensible means,
  (g) and a means mounted on said standard and urged into engagement with said flexible member to hold same against retractive movement upon contraction of the extensible member,
  (h) said means on the standard and the portion of the means actuated by the extensible member which engage the flexible member being unidirectional in the holding engagement therewith to permit said flexible member to move thereby in one direction and limit movement in the opposite direction.

2. A mechanism for straightening automobile body parts comprising,
  (a) a supporting beam of appreciable length,
  (b) means connecting a portion of an automobile to one end portion of said supporting beam,
  (c) a standard fixed to the other end portion of the supporting beam and upstanding therefrom,
  (d) a lever having one end portion pivotally mounted on said beam and extending from the other end portion thereof,
  (e) an extensible member rockably connected to said standard and having a connection with said lever whereby extension and contraction of the extensible member will swing the lever on its pivot,
  (f) a flexible member connected to a portion of an automobile to be straightened,
  (g) means on said lever engaging said flexible member and applying tension thereto in response to movement of said lever by extension of the extensible means, and releasing said flexible member during retractive movement of said lever by contraction of the extensible means,
  (h) and a means mounted on said standard and urged into engagement with said flexible member to hold same against retractive movement upon contraction of the extensible member.

3. A mechanism as set forth in claim 2 wherein the means on the lever and on the standard engaging the flexible member are fingers that are unidirectional in the holding engagement with the flexible member to thereby permit said flexible member to move thereby in one direction and to limit movement thereof in the opposite direction.

4. Any mechanism for straightening automobile body parts comprising,
  (a) a supporting beam of appreciable length,
  (b) means connecting a portion of an automobile to one end portion of said supporting beam,
  (c) a standard fixed to the other end portion of the supporting beam and upstanding therefrom,
  (d) a lever having one end portion pivotally mounted on said beam and extending from the other end portion thereof,
  (e) an extensible member rockably connected to said standard and having a connection with said lever whereby extension and contraction of the extensible member will swing the lever on its pivot,
  (f) guide means on said standard spaced above said lever,
  (g) a flexible member connected to a portion of an automobile to be straightened and extending over said guide means and having a portion extending downwardly therefrom,
  (h) means on said lever engaging said flexible member and applying tension thereto in response to movement of said lever by the extensible means in a direction away from said guide means, and releasing said flexible member during retractive movement of said lever by contraction of the extensible means,
  (i) and a means mounted on said standard between the guide means and lever urged into engagement with said flexible member to hold same against retractive movement upon contractive movement of the extensible member.

5. A mechanism as set forth in claim 4 wherein there are roller means mounted on the beam adjacent ends thereof for movably supporting said beam.

6. A mechanism for straightening automobile body parts comprising,
  (a) a supporting beam structure of appreciable length consisting of telescoping members whereby the telescoping of one member into the other will vary the length of said beam,
  (b) means engaging said beam portions to retain same in selected positions,
  (c) an anchor member selectively engageable with beam portions spaced along the length thereof to secure said anchor member relative to said beam,
  (d) means connecting said anchor member to a portion of an automobile,
  (e) a standard fixed to said opposite end portion of the supporting beam and upstanding therefrom,
  (f) a hydraulic ram rockably connected to said standard in upwardly spaced relation to said beam,
  (g) a flexible link chain having one end portion connected to a portion of an automobile,
  (h) means actuated by said ram and having a slotted finger engaging a chain link to apply tension to said chain in response to extension of said hydraulic ram and releasing said chain in response to contraction of said hydraulic ram,
  (i) and a slotted finger mounted on said standard and engaging said chain to hold same against retractive movement upon contractive movement of said ram and permitting movement of the chain thereby in response to extension of said ram.

7. A mechanism for straightening automobile body parts comprising,
  (a) a supporting beam structure of appreciable length,
  (b) an anchor member selectively engageable with beam portions spaced along the length thereof to secure said anchor member relative to said beam, (c) means connecting said anchor member to a portion of an automobile, (d) a lever having one end portion pivotally mounted on said beam adjacent the end opposite said anchor, (e) a standard fixed to said opposite end portion of the supporting beam and upstanding therefrom, (f) a hydraulic ram rockably connected to said standard in upwardly spaced relation to said beam and having a piston rod extending from one end thereof and rockably connected to other end of the lever, (g) a pulley rotatably mounted on said standard at selected elevations, (h) a flexible link chain having one end portion connected to a portion of an automobile to be straightened and extending over said pulley, (i) a slotted finger fixed on said lever and engaging a chain link to apply tension to said chain in response to swinging movement of said lever by said hydraulic ram and release the chain on retractive movement of said lever, (j) and a slotted finger slidably mounted on said standard between the pulley and the lever and engaging said chain to hold same against retractive movement upon contractive movement of said ram and release said chain upon extension of said ram.

8. Any mechanism for sraightening automobile body parts comprising, (a) a supporting beam structure of appreciable length consisting of telescoping members whereby the telescoping of one member into the other will vary the length of said beam, (b) means engaging said beam portions to retain same in selected positions, (c) roller means mounted on said beam members adjacent opposite ends for movably supporting said beam, (d) an anchor member selectively engageable with beam portions spaced along the length thereof to secure said anchor member relative to said beam, (e) means connecting said anchor member to a portion of an automobile, (f) a lever having one end portion pivotally mounted on said beam adjacent the end opposite said anchor, (g) a standard fixed to said opposite end portion of the supporting beam and upstanding therefrom, (h) a hydraulic ram rockably connected to said standard in upwardly spaced relation to said beam and having a piston rod extending from one end thereof and rockably connected to the other end of the lever, (i) a pulley rotatably mounted on said standard at selected elevations, (j) a flexible link chain having one end portion connected to a portion of an automobile to be straightened and extending over said pulley and downwardly therefrom, the selected elevations of the pulley on the standard effecting the direction of force applied to the automobile by the chain, (k) a slotted finger fixed on said lever and engaging a chain link to apply tension to said chain in response to downward swinging movement of said lever by said hydraulic ram, (l) and a slotted finger slidably mounted on said standard between the pulley and the lever and engaging said chain to hold same against retractive movement upon contractive movement of said ram, said fingers on the lever and standard being unidirectional in the holding engagement with the chain thereby permitting the chain to move thereby in one direction and limit the movement in the opposite direction.

References Cited
UNITED STATES PATENTS

| | | | |
|---|---|---|---|
| 1,537,070 | 5/1925 | Dixon | 254—78 XR |
| 2,606,670 | 8/1952 | Weaver | 254—78 XR |
| 3,276,237 | 10/1966 | Transue | 72—316 XR |

CHARLES W. LANHAM, *Primary Examiner.*

E. SUTTON, *Assistant Examiner.*